E. THOMSON.
INDUCTION MOTOR.
APPLICATION FILED DEC. 11, 1913.
1,134,776.
Patented Apr. 6, 1915.
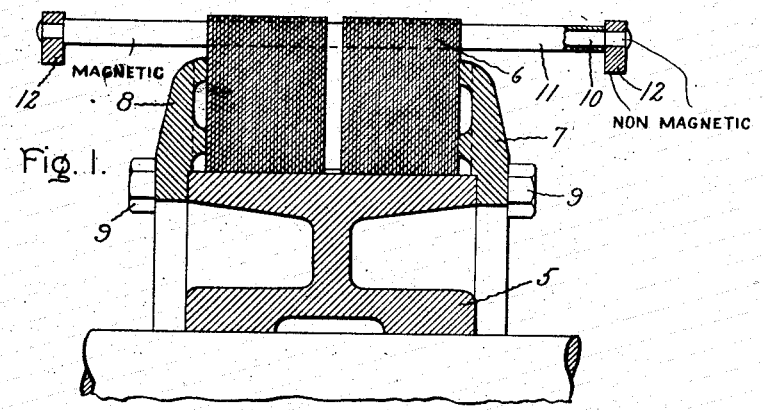
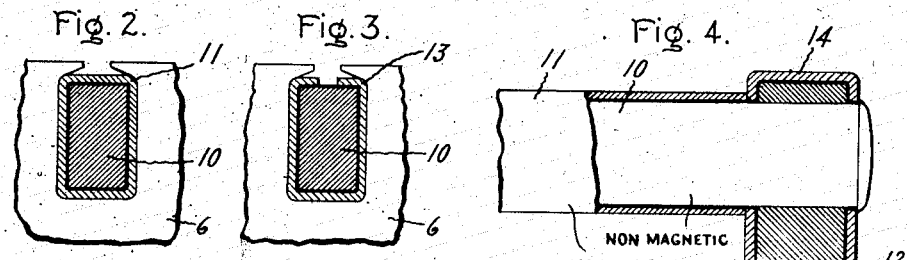
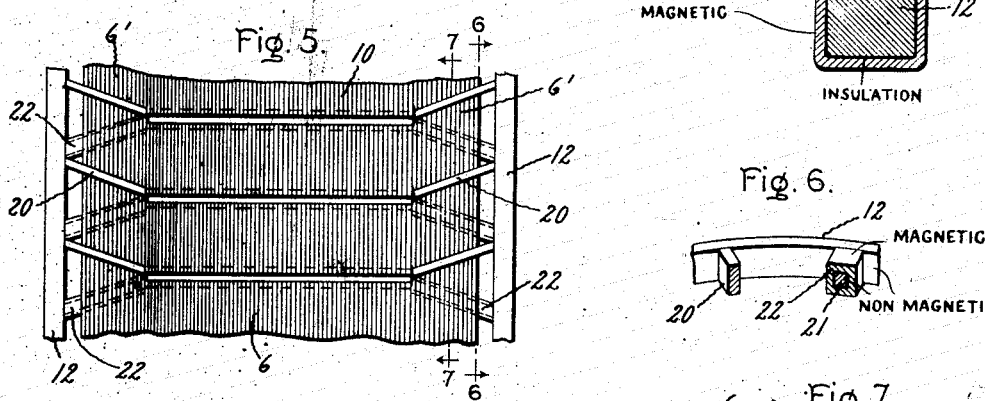
Witnesses.
Anthony Marx
J. Ellis Glen
Inventor:
Elihu Thomson
by Albert G. Davis
His Attorney

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

INDUCTION-MOTOR.

1,134,776. Specification of Letters Patent. Patented Apr. 6, 1915.

Application filed December 11, 1913. Serial No. 806,091.

*To all whom it may concern:*

Be it known that I, ELIHU THOMSON, a citizen of the United States, residing at Swampscott, county of Essex, State of Massachusetts, have invented certain new and useful Improvements in Induction-Motors, of which the following is a specification.

My invention relates to induction motors and particularly to those whose rotors have squirrel cage windings.

It is well known in the art that it is desirable to have a high resistance in the secondary circuit of an induction motor when starting and a low resistance after the motor has reached normal speed. Various means for obtaining this result have been proposed and one well known arrangement is that wherein two windings are used, of which one has a low resistance and a high inductance and the other has a high resistance but a low inductance. The inductance of a conductor is directly proportional to the frequency and since, when starting, the slip is large, the secondary currents will have a high frequency and the inductance will be proportionately large. That winding having a high inductance will, therefore, have a high impedance and the secondary currents will flow through the other winding which has a higher ohmic resistance, but a lower impedance. When the slip has been reduced by the speeding up of the motor, the frequency of the secondary currents will become small and the effect of self induction minimized so that the greater part of the secondary current will pass through the low resistance winding. These windings have been given various forms in order to obtain the desired result, and it is understood that one means of giving a winding a higher inductance is to sink the bars thereof below the periphery of the secondary member in order that they may be entirely surrounded by magnetic material. The consequence of such a construction is that the bars will have a higher inductance because of the lower reluctance of the surrounding metal for the passage of the self induced magnetic flux.

My invention relates more particularly to the secondary windings of induction motors and the object of my invention is to provide a form of secondary winding which shall have the characteristics described above as being desirable and at the same time shall be simple, efficient, and desirable from the standpoint of mechanical construction as well as of electrical efficiency. I have attained these results by making my secondary winding of such a form that it comprises parallel circuits, one circuit having a high resistance and a low inductance, while the other has a high inductance and a low resistance. The practical embodiment of such a structure may take various forms. For instance, I may apply to the ordinary squirrel cage winding a sheath or jacket of iron or other magnetic low reluctance, high resistance conductor. Again, I may have the bars of an ordinary squirrel cage winding branch through parallel circuits of the requisite characteristics and interposed between the ends of the bars and the end rings. I may use the sheathed form of conductor previously mentioned for one of these circuits and bury it in the laminations and make the other of any suitable high resistance metal, and locate it in an open groove.

I am well aware that similar results have heretofore been obtained by other constructions. My invention, however, consists in certain novel features of construction which have been definitely indicated in the claims appended hereto. The particular construction which I have employed and the mode of operation thereof when applied to induction motors will be understood from the following description when taken in connection with the accompanying drawings in which:

Figure 1 is a partial longitudinal section of the rotor of an induction motor; Fig. 2 is a fragmental transverse section showing a single slot and a sheathed conductor embedded therein; Fig. 3 is a similar view showing a modified construction of the surrounding sheath; Fig. 4 is an elevation, partly in section, of the end of a conductor bar with its attached end ring, the end ring being shown as also sheathed; Fig. 5 is a plan view of a fragment of a rotor with branch circuits between the rotor bars and the end rings; Fig. 6 is a fragmental perspective view, partly in section, on the line 6—6 of Fig. 5; Fig. 7 is a fragmental section on the line 7—7 of Fig. 5.

In the construction shown in Figs. 1 and 2, the ordinary spider 5 of the rotor carries a slotted, laminated core 6 which is held together by means of end clamps 7 and 8 and bolts 9. In each slot of the rotor is a conductor bar 10 of copper or other material of low resistance and this bar is jacketed or sheathed, as at 11, over as much of its length as may be desirable. For this sheath I employ some magnetic material, as iron, which has a high resistance, but a low reluctance. Connected to the ends of the bars in the usual manner are shown the end rings 12, which may also be in good electrical contact with the sheaths 11, if desired. Preferably, a thin coating of lacquer or shellac may be placed upon the bars 10 to insulate them from the iron sheath 11. It is evident then that the construction described forms two systems of conductors, each of which is substantially out of contact, or at least measurably insulated from the other system, though not necessarily so. I have therefore provided two independent systems of conductors connected to a common end ring, which systems will have the desired characteristics. The metallic sheaths will constitute one system and will have a high resistance but their impedance will be low, due to the fact that they are placed in an open slot. The copper bars will constitute the other system and will have a low resistance but a high impedance, due to the large inductance when the frequency is large, as at starting. Thus these systems are electrically independent, but it will be seen that they are mechanically integral, and that the construction of the motor, as well as the repair thereof, will be greatly facilitated.

If it is found undesirable to close the iron sheath around the conductor entirely, it can have a slot just within the ordinary slot in the core of the rotor. Fig. 3 shows this form of construction wherein the slotted sheath 13 partially surrounds the conductor bar 10.

In Fig. 4 I have shown the end of one of the conductor bars 10 as attached to its end ring 12, the conductor bar being inclosed with its sheath 11, while the end ring in this instance is also inclosed by means of a sheath 14. These sheaths 14 will also be preferably insulated from the end rings 12 by shellac or lacquer, but the sheaths 11 and 14 will have good electrical contact with one another. With this construction, it will be seen that the two systems of conductors will have electrically independent but mechanically integral end rings as well as conductors.

Instead of making the parallel circuits coextensive with the conductor bars, I may interpose them between the ends of the bars 10 embedded in the lamination 6 and the end rings 12, as shown in Figs. 5, 6, and 7. Here, I make the circuit of high resistance of any convenient form, and I have indicated it as a bar 20 of relatively small cross-section, which would ordinarily be constructed of some metal having a high specific resistance. For the circuit of high inductance, I may use, if desired, a copper bar 21 sheathed at 22 with some magnetic material of low reluctance, and this sheath may be insulated from the bar 21, or not, as found most desirable. To further increase the inductance of the bars 21, I have constructed the rotor with laminations 6' of special form, which are applied to the rotor at either end thereof beyond the ends of the bars 10. These laminations are provided with grooves 23 in which the extensions 20 are located, while the extensions 21 are buried within the iron, thereby increasing their inductance.

It will be evident from the foregoing description that I have provided a squirrel cage winding having an inductively changing effective resistance and possessing the characteristics hereinbefore mentioned. As previously suggested, my improved type of winding may be considered as a double squirrel cage winding comprising a low resistance member of high inductance and a high resistance member. As shown in Fig. 1, both members of the double squirrel cage winding are connected to the same end rings. In Fig. 4, however, I have shown a modification, in which the two members are complete squirrel cage windings in themselves, each consisting of conductors connected to short circuiting end rings. If desired, however, the insulation may be omitted from the conductor bars and end rings, and good electrical contact maintained between the conductor bars, end rings, and their sheaths. In this instance, similar results will be attained because of the inductance of the copper bars, whereby the high frequency secondary currents which exist at starting will flow chiefly in the high resistance sheaths, as will be later more fully explained.

The operation of that form shown in Figs. 5, 6, and 7 will depend on similar considerations. Evidently, when the motor is starting the high frequency currents of the rotor will be kept out of the highly inductive branch 21 and forced to flow through the high resistance branch 20. After the motor has speeded up, the inductance of branch 21 will have less effect, and this branch will provide a low resistance path to the end ring. Broadly, therefore, I have provided an automatic means for changing the effective resistance of the rotor winding. The effectiveness of my improved form of secondary winding is due primarily to the proximity of a relatively large mass of magnetic material about the low resistance conductor bars. The surrounding of the low resistance bars 10 with a sheath of magnetic material and the location of the conductor bars and the inclosing sheath in a relatively deep slot in the magnetic core of the rotor, imparts to the conductor bars a high inductance. On account of this high inductance, the impedance of the secondary winding is considerably greater when, as at starting the frequency of the secondary currents is relatively large, and only a very small portion of these currents will flow in the low resistance member 10 of the magnetically clad conductor bars or in the extensions 21 or the branch 32. Instead, the greater portion of the secondary currents of high frequency will be forced into the conductor of low inductance, and will thus flow in the magnetic sheaths 11 the extensions 20. The path of the secondary currents under such circumstances will be of high resistance. As the slip of the motor decreases and the frequency of the secondary currents decreases, a greater portion of these currents will flow in the low resistance member of the magnetically clad conductor bars until the motor has attained normal slip, when substantially all the secondary currents will be carried by the low resistance bars 10 or the extensions 21. It will thus be evident that, due to the inductance of the copper bar, the effective resistance of the magnetically clad conductor bars is relatively high for secondary currents of high frequency, and relatively low for secondary currents of low frequency.

While I have herein shown and described the preferred embodiment of my invention, I do not desire to limit myself to this particular arrangement. I conceive that other modifications embodying my invention may be developed, and I aim to include these within the scope of the appended claims.

What I claim as new and desire to secure by Letters Patent of the United States is:—

1. A winding for the secondary member of induction motors including a plurality of low resistance conductors, sheaths of magnetic material therefor, said sheaths completely incasing said conductors and providing a current path of high resistance parallel to that of said conductors, and means electrically connecting the ends of said conductors.

2. In the rotor of an induction motor, a two-part squirrel cage winding, one part of said winding being electrically insulated from the other part but mechanically integral therewith.

3. In the rotor of an induction motor, a two-part squirrel cage winding, one part of said winding being electrically insulated from the other part but mechanically integral therewith, one part having a high inductance and a low resistance while the other part has a low inductance and a high resistance.

4. In the rotor of an induction motor, a squirrel cage winding having bars of low resistance, sheaths of magnetic material substantially incasing said bars and providing a current path of high resistance in parallel to that of said bars.

5. In the rotor of an induction motor, a squirrel cage winding having bars of low resistance sheaths of magnetic material substantially incasing said bars, the bars being insulated from the sheaths and both the bars and sheaths being connected by end rings.

6. A squirrel cage winding for the rotor of an induction motor comprising copper bars, end rings therefor, and a sheath of magnetic material incasing said bars and end rings.

In witness whereof, I have hereunto set my hand this ninth day of December, 1913.

ELIHU THOMSON.

Witnesses:
JOHN A. McMANUS, Jr.,
ROBERT SHAND.